J. C. H. VOELCKER.
FAUCET.
APPLICATION FILED FEB. 28, 1908.

918,714.

Patented Apr. 20, 1909.

Inventor
Jacob C. H. Voelcker.

Witnesses
Hugh H. Ott.
K. Allen.

By Victor J. Evans
Attorney

UNITED STATES PATENT OFFICE.

JACOB C. H. VOELCKER, OF LOUISVILLE, KENTUCKY.

FAUCET.

No. 918,714.  Specification of Letters Patent.  Patented April 20, 1909.

Application filed February 28, 1908. Serial No. 418,396.

*To all whom it may concern:*

Be it known that I, JACOB C. H. VOELCKER, a citizen of the United States, residing at Louisville, in the county of Jefferson and State of Kentucky, have invented new and useful Improvements in Faucets, of which the following is a specification.

This invention relates to faucets, and the object of the invention is to provide a faucet primarily intended for dispensing carbonated liquids, whereby the liquid may be drawn from the faucet at a full flow or at a jet spray, the parts being so arranged that the valves are automatically closed under pressure of springs and whereby the liquid may be dispensed either at a full flow or a jet spray independent of each other or the spray and flow of the liquid ejected at the same time, thus thoroughly agitating and mixing the liquid.

With these objects in view the invention resides in the novel construction of faucets, hereinafter fully described and claimed.

Figure 1:
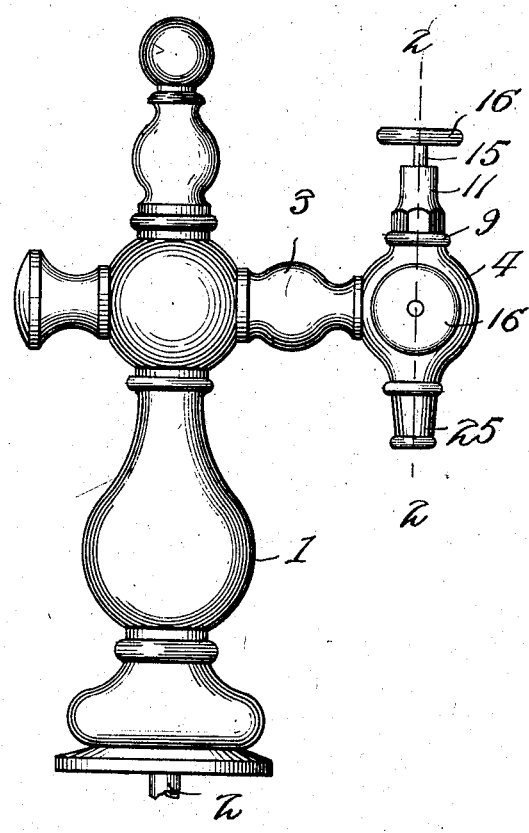
Figure 2:
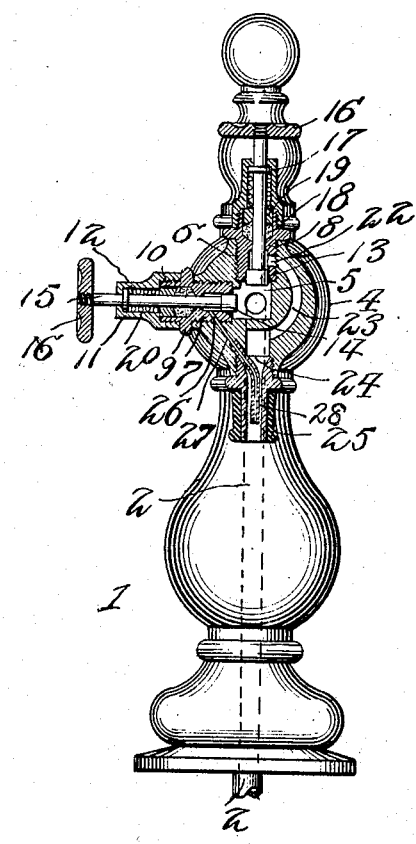

In the accompanying drawings, Figure 1 is a side elevation of a faucet constructed in accordance with my invention. Fig. 2 is a vertical transverse section upon the line 2—2 of Fig. 1.

In the drawings, the numeral 1 designates the body of my improved faucet. The body 1 is provided with a central passage 2, communicating with an offset 3, provided upon the body of the faucet. The offset 3 is provided with a vertical member 4. The member 4 has an L-shaped passage or channel 5, communicating with the passage provided in the offset 3 of the body. The vertical and horizontal walls of the L-shaped passage are suitably screw threaded as at 6 and adapted for the reception of threaded bushings 7 and 8. The bushings are each provided with a flange 9, adapted to contact with the outer faces of the walls of the member 4 within which are provided the L-shaped passages 5. The bushings are provided with a threaded extension 10, adapted for the reception of a threaded collar 11. The collar 11 is provided with a central channel 12, and the bushings 7 and 8 are likewise provided with central channels alining with the channel of the collars.

The bushings 7 and 8 are provided with suitable valve seats 13, each being adapted for the reception of a valve 14, provided upon suitable valve stems 15. The valve stems 15 are threaded at their outer extremity to provide for the reception of suitable disks or buttons 16, by which the valves are operated. Each of the valve stems 15 are provided with a suitable collar 17 adapted to abut against the inner face of the wall of the channel 12 provided in the collars 11.

The bushings 7 and 8 are provided with annular inturned portions adapted for the reception of a suitable packing 18. The packing 18 is retained in position by a suitable washer 19, and interposed between this washer and the collar 17 of the valve stems is a helical spring 20, which is normally adapted to force the collar 12 against the inner wall of the channel 11, and thus securely position the valves upon their seats. The bushing 8 is provided with a suitable opening 22, communicating with an opening 23 within the member 4 which in turn communicates with the outlet passage 24 provided within the nozzle 25.

It will be seen that when pressure is exerted upon the vertical disk, the valve 13 is unseated and the carbonated fluid allowed to flow through the passage 22 of the bushing through the passage 23 and out of the passage 24 provided by the nozzle. The fluid following this course is ejected in a full flow, but it is desirous to dispensing the carbonated liquids to eject a jet spray, which will agitate and stir the liquid already dispensed at a full flow, and to accomplish this I have provided the bushing 7 with a small angular passage 26, communicating with a similar passage 27, provided within the body of the member 4. The passage 27 communicates with the passage 24 of the nozzle 25, and is provided with a pipe extension 28, leading within the passage 24 and terminating at a slight distance below the mouth of the nozzle. It will be seen that when pressure is exerted upon the knob or disk 16 of the horizontal bushing 7, that the value 14 is unseated and the liquid allowed to flow through the passages 26 and 27 and through the extension 28, when it is dispensed through the mouth of the nozzle in a spray.

From the above description it will be noted that I have provided a simple, cheap and efficient faucet for dispensing carbonated liquids, one in which the liquid may be dispensed at a full flow or at a jet flow independently, or by which the liquid may be dispensed at a combined full and jet flow, the valves of the faucet being so arranged as to automatically close when pressure upon the valve stems is released.

Having thus fully described the invention what is claimed as new is:

A faucet having an L-shaped channel communicating with an inlet passage, the right angular walls provided by the L-shaped passage being provided with bushings, collars upon the bushings, valve seats upon the bushings, valves having valve stems within the bushings, the valve stems extending through an opening provided in the collars, packing for the valve stems, a collar upon the valve stems, a spring upon the stems, contacting with the collar to normally seat the valves, one of the bushings being provided with an opening communicating with the outlet passage of the faucet, the other bushing being provided with a reduced opening communicating with the outlet passage of the faucet, and a pipe extension provided upon the reduced opening and extending within the outlet passage and terminating in the mouth thereof.

In testimony whereof I affix my signature in presence of two witnesses.

JACOB C. H. VOELCKER.

Witnesses:
THEODORE KOERNER,
FRANK J. L. MORAT.